United States Patent
Cuadrat et al.

(10) Patent No.: US 8,965,339 B2
(45) Date of Patent: Feb. 24, 2015

(54) AUTOMATIC OSCILLATING BIP SESSION FOR SIM SELF-REACTIVATION

(75) Inventors: Ruben Cuadrat, New York, NY (US); Praveen Venkataramu, Bridgewater, NJ (US); Rama Yaddanapudi, Saddle Brook, NJ (US); Warren Hojilla Uy, Randolph, NJ (US); Xuming Chen, San Ramon, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 124 days.

(21) Appl. No.: 13/427,624

(22) Filed: Mar. 22, 2012

(65) Prior Publication Data

US 2013/0252584 A1     Sep. 26, 2013

(51) Int. Cl.
   *H04M 1/66*     (2006.01)
   *H04M 1/68*     (2006.01)
   *H04M 3/16*     (2006.01)

(52) U.S. Cl.
   USPC ........ 455/411; 455/410; 455/414.1; 455/418; 455/419; 455/420; 455/435.1; 455/558

(58) Field of Classification Search
   CPC ..... H04W 12/12; H04W 12/06; H04W 8/245; H04W 60/00; H04L 29/08108; H04M 1/72533; H04B 1/3816
   USPC .......... 455/410, 411, 414.1, 418–420, 435.1, 455/558
   See application file for complete search history.

(56) References Cited

U.S. PATENT DOCUMENTS

| | | | | |
|---|---|---|---|---|
| 5,954,817 A * | 9/1999 | Janssen et al. | ................. | 713/169 |
| 5,956,636 A * | 9/1999 | Lipsit | ............................ | 455/411 |
| 6,014,561 A * | 1/2000 | Molne | .......................... | 455/419 |
| 6,370,374 B1 * | 4/2002 | Eichinger et al. | ............. | 455/411 |
| 6,591,098 B1 * | 7/2003 | Shieh et al. | .................... | 455/419 |
| 6,898,445 B2 * | 5/2005 | Slettengren et al. | .......... | 455/567 |
| 7,089,036 B2 * | 8/2006 | Prise | ............................ | 455/558 |
| 7,266,371 B1 * | 9/2007 | Amin et al. | ................... | 455/419 |
| 7,539,514 B2 * | 5/2009 | Shieh et al. | .................... | 455/558 |
| 7,623,852 B2 * | 11/2009 | Gnuschke | ..................... | 455/419 |
| 7,706,791 B2 * | 4/2010 | Heutschi | .................... | 455/435.1 |
| 7,929,959 B2 * | 4/2011 | De Atley et al. | .............. | 455/418 |
| 8,036,708 B2 * | 10/2011 | Oozeki | ......................... | 455/558 |
| 8,306,571 B2 * | 11/2012 | Larsson | ........................ | 455/558 |
| 8,478,338 B2 * | 7/2013 | Sudhakar | ..................... | 455/558 |
| 2003/0083068 A1 * | 5/2003 | Wong | ............................ | 455/435 |

* cited by examiner

*Primary Examiner* — Steve D Agosta

(57) ABSTRACT

A method and article of manufacture to reactivate a user identity card for a mobile station that communicates with a network is described. The user identity card is initially activated with the network. The user identity card has a unique identifier. Activation includes communicating with the mobile station from the network and programming the user identity card with network parameters. The network parameters programmed on the user identity card are then cleared after a preset period of time. The user identity card is reset to an unactivated state and then the user identity card can be reactivated with the network.

20 Claims, 7 Drawing Sheets

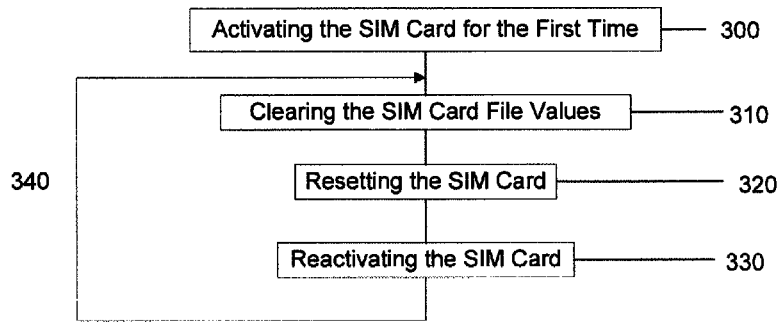
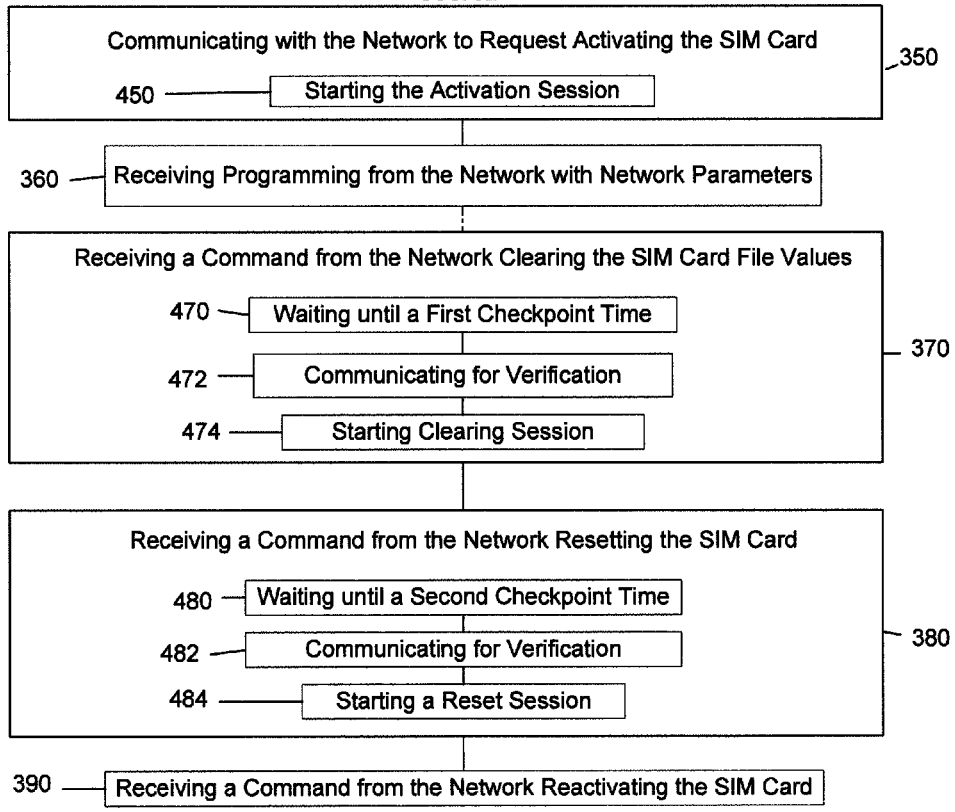

AUTOMATIC OSCILLATING BIP SESSION FOR SIM SELF-REACTIVATION

BACKGROUND INFORMATION

Mobile phones and other user devices rely on a user identity card to identify the phone or device for communication on a communication network. The user identity card (UIC) can be a Subscriber Identification Module (SIM) card used in a GSM network, a Universal Integrated Circuit Card (UICC) used in a UMTS network, a Removable User Identity Module (R-UIM) used in a CDMA network, or the like. The UIC is an integrated circuit that securely stores a unique identifier for identifying a subscriber on a mobile network. When the UIC is installed in a mobile phone or other device requiring access to the mobile network, the UIC is communicatively coupled to a processor of the mobile device. The processor retrieves the unique identifier from the UIC in order to uniquely identify the device on the network.

For example, a SIM card stores a unique International Mobile Subscriber Identity (IMSI) identifier. The IMSI is sent to the network by a device in which the SIM card is installed to identify the device, and to enable the network to retrieve subscriber information associated with the IMSI from a home location register (HLR) or visitor location register (VLR) of the network. The UIC is most often removably inserted into a device. However, some UICs are permanently soldered into the device.

In an LTE network (Long Term Evolution—which involves 3rd generation partnership (3GPP) and 4th generation (4G) technology), SIMs are activated via a Bearer Independent Protocol (BIP), a Hyper Text Transfer Protocol (HTTP), or an Over-The-Air (OTA) protocol connection between the SIM and an OTA platform. However, SIM activation only happens once in the lifetime of a SIM card. SIM activation is a "one-shot" challenge. Once the card is activated it will not start another activation.

The one-shot activation feature is magnified when attempting to test new activation protocols and features. Every test currently requires a new UIC to be activated. Once tested for activation, the UIC cannot be used for further activation testing, and it typically used for other UIC or mobile device testing or discarded. Testing procedures can run through 100s of UICs to finally get a protocol to function properly. In addition, some parameters to accept a new protocol require few successes because of the number of UICs required for an extensive test.

Hence a need exists for a method to automatically reactivate a UIC so it can be used multiple times to test UIC activation.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 3A is a flow chart outlining exemplary steps for reactivating a UIC.

FIG. 3B is a flow chart outlining an example of steps for reactivating a UIC.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to automatically re-activating a UIC so it can be used multiple times to test UIC activation. The specific examples below use a SIM card and a LTE network. However, one of ordinary skill can utilize the examples outlined below for any UIC or network configuration.

Reference now is made in detail to the examples illustrated in the accompanying drawings and discussed below.

An authentication semiconductor element (such as a UIC or a secure element) is a semiconductor device that includes a dedicated memory, runs its own operating system, and is used to authenticate over a wireless or other network connection the identity of a user device it is electrically connected to. For example, a UIC such as a SIM card authenticates a user mobile station on a mobile network or a secure element authenticates a user device in a wireless payment transaction.

Figure 1:
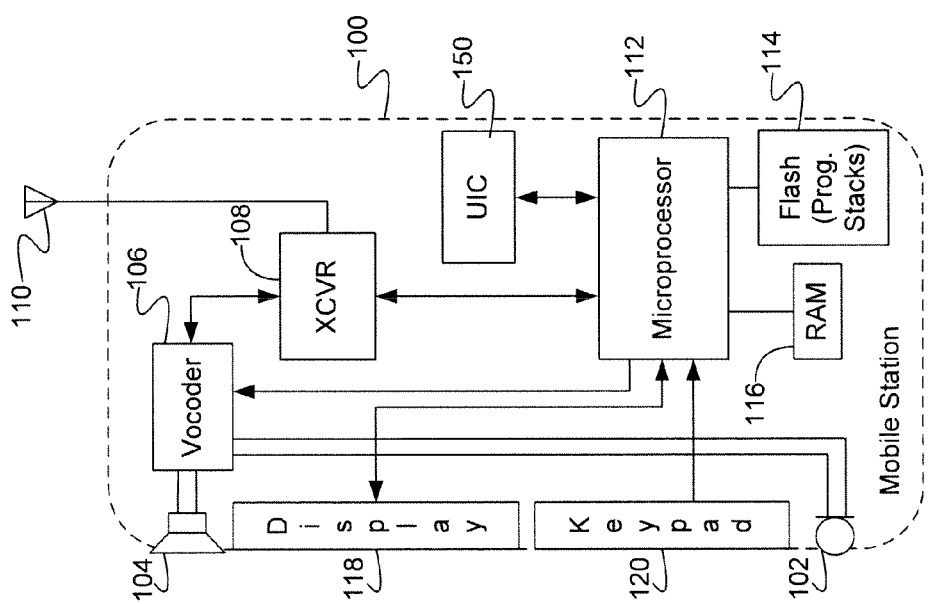
FIG. 1 illustrates a diagram of a mobile station with a UIC.

FIG. 1 illustrates a high-level functional block diagram of an exemplary mobile station as may utilize the UIC to perform activation, authentication and identification through a communication network. The user device may be a mobile station such as a phone, a smart-phone or a tablet, or may be incorporated into another device, such as a personal digital assistant (PDA), a portable computer, air card, or the like.

More generally, the user device may be any device configured to have an authentication element installed therein, and may include for example a wireless payment device configured to have a secure element installed therein. The principles of the invention may also be used in the context of other semiconductor elements configured for activation, initiation and authentication of user devices.

FIG. 1 shows a mobile station 100 in the form of a mobile phone handset, such as a feature phone or smart-phone. The handset embodiment of the mobile station 100 functions as a normal digital wireless telephone station. For that function, the mobile station 100 includes a microphone 102 for audio signal input, a speaker 104 for audio signal output, and voice coding and decoding circuitry (vocoder) 106. The mobile station 100 also includes a display 118 and keypad 120 for providing a textual or graphical user interface. Although not shown in this simple example, many mobile phone devices include touch screens as a major component of the user interface.

For digital wireless communications, the mobile station 100 includes at least one communication interface such as a wireless digital transceiver (XCVR) 108. Today, the mobile station 100 can be configured for digital wireless communications using one or more of the common network technology types. The concepts discussed here encompass embodiments of the mobile station 100 utilizing any digital transceivers that conform to current or future developed digital transceiver communication standards. The mobile station 100 may also be capable of analog operation via a legacy network technology, a wireless local area network, a global positioning system (GPS) receiver, and/or of communications using near-field communication (NFC) technologies. The transceiver 108 provides two-way wireless communication of information, such as vocoded speech samples and/or digital information, in accordance with the technology of the communication system and/or network 200 to which the mobile station 100 connects. The transceiver 108 also sends and receives a variety of signaling messages in support of the various voice, data, and other communication services provided via the mobile station 100 and the external communication system/network 200. Each transceiver 108 connects through RF send and receive amplifiers (not separately shown) to an antenna 110.

A microprocessor 112 serves as a programmable controller for the mobile station 100, in that it controls all operations of the mobile station 100 in accord with programming that it executes, for all normal operations, and for operations involved in interfacing with an authentication semiconductor element installed in the mobile station 100. In the example, the mobile station 100 includes flash type program memory 114, for storage of various "software" or "firmware" program routines and mobile configuration settings for loading and execution in the microprocessor 112. The mobile station 100 may also include a non-volatile random access memory (RAM) 116. The memories 114, 116 also store various data, such as a boot routine, device driver software, an operating system, and other applications. The memories 114, 116 also store telephone numbers and server addresses, downloaded data and various data input by the user.

The mobile station 100 also includes socket for connecting to and communicating with an authentication semiconductor element 150 (UIC or SIM card) installed in the mobile station, and for retrieving from the authentication semiconductor element identification or authentication information such as a mobile directory number (MDN) and/or mobile identification number (MIN), etc. In one example, programming stored in the flash memory 114 configures the processor 112 so that the mobile station is capable of performing various desired functions, including functions related to communicating with an authentication semiconductor device 150 installed in the mobile station through the socket. In particular, processor 112 communicates with an authentication semiconductor device 150 installed in mobile station 100 to retrieve an international mobile subscriber identity (IMSI) identifier stored on the installed authentication element. The processor then transmits the retrieved IMSI to the communication network or system to identify and/or authenticate the mobile station 100 and installed authentication element for communication.

Figure 2:
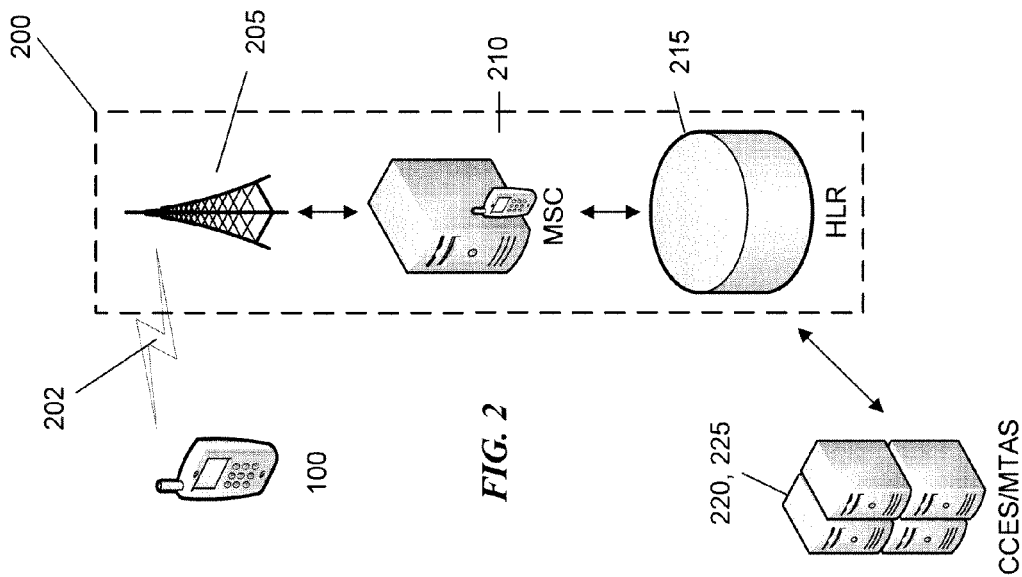
FIG. 2 is a simplified diagram of a cellular network UIC activation communication path.

A typical authentication process follows a particular path in the network, as illustrated in FIG. 2. The mobile station 100 powers up and starts to communicate 202 with the network 200. The basic components are the antenna/base transceiver station/base station controller (hereinafter "base station") 205. The antenna receives the communication signal 202 from the mobile station 100 and the base station 205 routes the communication to a master switching center (MSC) 210. The MSC 210 routes the incoming and outgoing calls to and from the fixed-line networks or other cellular networks. The MSC 210 also contains a Home Location Register (HLR) 215 which can provide the administrative information required to activate, authenticate, register and locate the mobile station 100 and identify that it is a subscriber on the network 200. The HLR 215 checks the identification stored on the SIM card 150 against its subscriber database. If the SIM 150 has never been activated, the HLR 215 works with the authentication centre (AuC) (not illustrated) to determine if the SIM card 150 is authentic and should be activated.

Further, over a private network of the cellular provider (not illustrated) can be a Customer Care Enterprise Server (CCES) 220 that can communicate with the other components of the network 200. The CCES can be a platform of servers that provide various functionalities. Examples include billing systems, network provisioning systems such as the Mobile Telephone Administration System (MTAS) 225, client account administration systems, and the like.

When a SIM card 150 is activated certain network parameters are set, including the International Mobile Subscriber Identity (IMSI) identifier, a mobile device number (MDN) and the MSISDN (sometimes known as the "Mobile Subscriber Integrated Services Digital Network Number"). IMSI identifies the SIM card 150 and the MSISDN is used to route calls to the mobile station 100. Once the SIM card 150 is activated, these numbers become permanent and are stored in the HLR 215 and the SIM card 150 to identify the mobile station 100 to the network 200.

Some of the areas that the mobile station 100 must be able to behave properly in are: default initial state (MDN/MSISDN zero), establishment of IP connections on any radio access technology (BIP/OPEN and CLOSE CHANNEL on 1x, EVDO, eHRPD and LTE), etc. Further tested features are the behavior of the mobile station 100 on Over-the-air service provisioning. When at least these activation features need to be tested, once the activation test is complete, the typical SIM card 150 cannot be reused.

Figure 4:
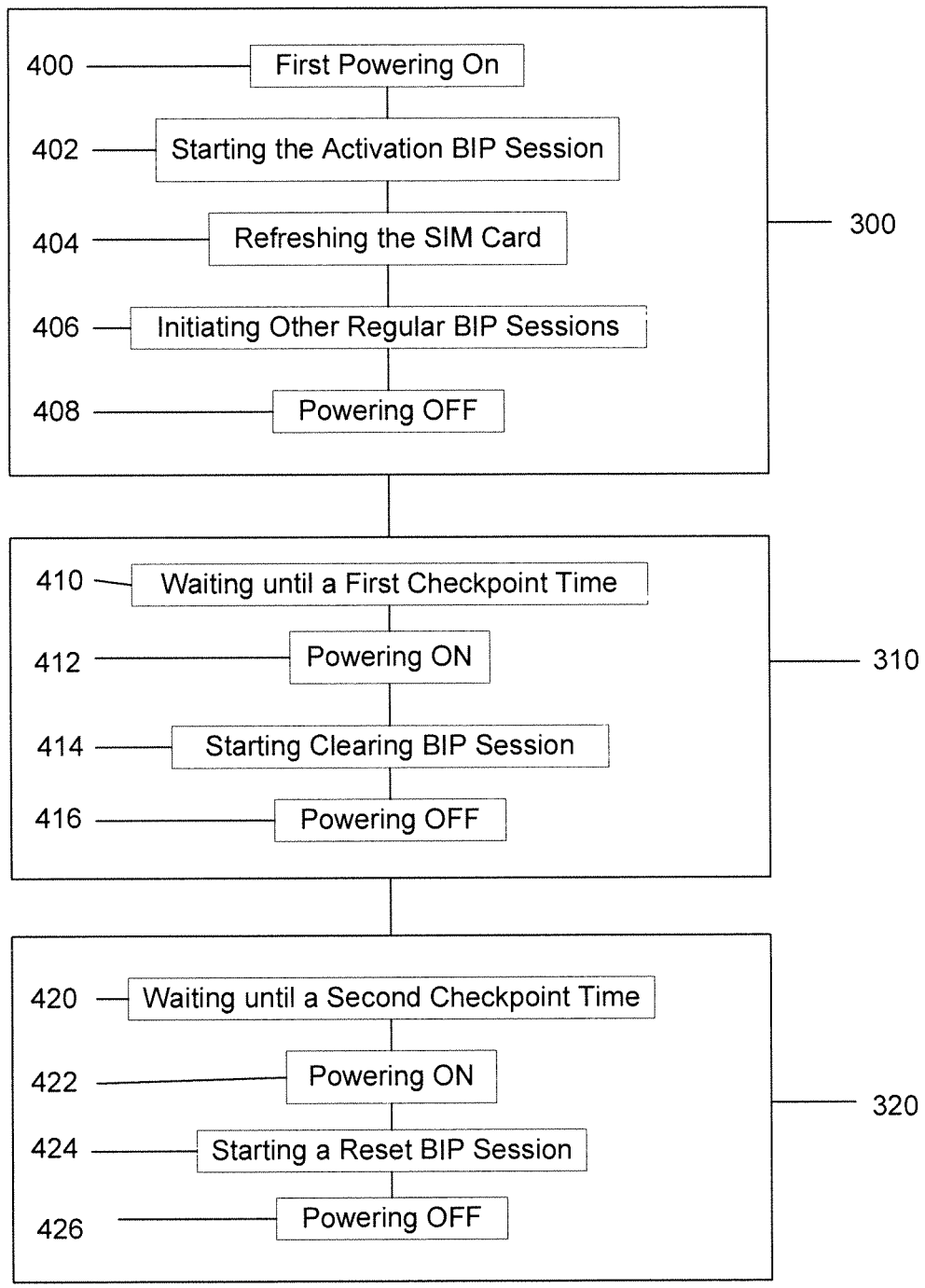
FIG. 4 is a flow chart outlining another example of steps to reactivate a UIC.

However, the examples illustrated in FIGS. 3, 4, and 5 allow the SIM card to be cleared and re-activated (oscillating between an activated and deactivated state), so the same SIM card can be used over and over again for activation testing. The SIM card and network features can be cleared from the SIM card, replaced with zero values, and then the SIM card is reset to act as if it has never been activated. Thus, the SIM card is activated, cleared, and reactivated in an oscillating cycle for as long as the user maintains the SIM card in the active simulation mode.

The example illustrated in FIG. 3A starts with a SIM card that has never been activated. It is placed in the mobile station 100 and the mobile station is powered on. This begins activating the SIM card for the first time in the mobile station 100 (step 300). The SIM card activation step includes a number of substeps, as illustrated in FIG. 4. The substeps include a first powering on of the mobile station and SIM card (step 400), starting the activation BIP ("Bearer Independent Protocol") session (step 402), refreshing the SIM card (step 404), initiating other regular BIP sessions (step 406), and powering off (step 408). The activation (step 300) of the SIM card is a normal activation session, as if the SIM card is not part of the oscillating protocols. Prior to a first checkpoint time, as discussed below, the SIM card acts as a typical SIM card, allowing for the mobile station to be activated and authenticated on the network 200 for cellular communication.

Once the SIM card activation has occurred (step 300), the network 200 and the SIM card can enter the active simulation mode (ASM). After the first activation, the file values on the SIM card are cleared by setting them to the default values (step 310). The clearing step can include waiting until a first checkpoint time is passed (step 410). In the waiting step, the mobile station 100 and the SIM card 150 are under the network protocols activated above (in step 300). The mobile station 100 "waits" for the checkpoint time so the network 200 can change over to the next set of ASM protocols. The network 200, before the checkpoint time, continues to function normally with regards to both "regular" SIM cards and retains the current protocol with the ASM SIM cards. From the network 200 standpoint, the network is waiting to change ASM protocols. The term "regular" and "ASM" SIM cards, in one example, are generally indistinguishable from each other, in that they have the same physical structure as two SIM cards of the same design can have, and have the same base programming. The difference between the SIM cards is how they are treated by the network 200. A "regular" SIM card is one installed in a mobile station and not subject to the ASM protocols. The network can distinguish between the two by their unique identifier (sometimes called a ICCID, discussed below). An ASM SIM once activated, is subjected to the ASM protocols because its ICCID is listed as such.

After the specified time, the network can start the first phase of the ASM. Prior to the first checkpoint time, when the SIM card 150 communicates with the network for the first time, the activation (step 300) takes place. After activation, but before the first checkpoint time, any further interaction between the SIM card/mobile station and the network treats the SIM card as a regular SIM card. Once the mobile station 150 is powered on (step 412) after the first checkpoint time, it communicates with the network. The communication between the mobile station and network verifies the SIM card. Verification can, in one example, be either activation or authentication with the network. The network now determines that this SIM card can enter ASM and starts a clearing BIP session (step 414). The clearing BIP session can include the network 200 instructing the SIM card to change the MDN back to zero, MSISDN back to zero, and IMSI_M back to NOT_PROGRAMMED. The clearing BIP session can convert some or all of the SIM card parameters back to the state they are in before the first activation. After the clearing step (step 414) the mobile station can be powered off (step 416).

Once the SIM card has been cleared (step 310) it can then be reset (step 320). The SIM card is set to the default state. The SIM card now has the internal parameters as if it was never activated. Resetting can include the steps of waiting until a second checkpoint time (step 420). The waiting step for the second checkpoint time (step 420) is similar to waiting for the first checkpoint time (step 410). The SIM card 150 and network 200 are functioning per the current protocols. The network 200 has the "clearing" ASM protocols in place and any ASM SIM that contacts the network for verification is subject to those protocols. After the second checkpoint time, the protocols change again, and in this example they change to the "reset" protocols.

In an example, clearing protocols deal with the contents of the ASM SIM card. When the ASM SIM is cleared, all of the data on the card is replaced with the default data, i.e., the same data as if the SIM card had never been activated. Further in this example, the resetting protocols deal with informing the SIM card that it has never been activated. The SIM card keeps a record of its own status, either activated or not activated. Once the "activated" data is cleared to non-activated data, the internal status of the SIM can be reset to non-activated, as well.

Similar to the above, any communication between an ASM SIM card and the network at any time after the first checkpoint time, but before the second checkpoint time, results in the SIM card being cleared (step 310). When the SIM card communicates with the network after the second checkpoint time, the SIM card can be reset (step 320). The mobile station/SIM card is powered on (step 422) and the reset BIP session is initiated (step 424). The reset BIP session allows the network to instruct the SIM card to reset and now the SIM card is in the default state as if it had never been activated.

The ASM examples above are, in one embodiment, for testing purposes. Mobile stations are tested before going on sale to the general public to make sure that they can communicate properly with the network 200. One of the parameters to test is SIM activation, since that is the way the mobile station is identified to the network, links the mobile station to the user account, and other network features. Since, as discussed above, SIM card activation is "one shot," (if activation fails the mobile station cannot get on the network) rigorous testing of activation protocols is desirable to provide a high level of confidence that the SIM activation will occur as designed.

In an alternate example, the SIM card is reset only to the parameters that affect activation, but other parameters on the SIM card that don't affect activation may not be reset. Once the reset BIP session (step 424) is complete, the mobile station/SIM card can be powered off (step 426). When the mobile station is again powered on, the SIM card is treated by the network as if it had never been activated, and the network and SIM card begin the activation protocols (step 330). After the reactivation has occurred, the same SIM card can be taken back through the ASM steps (step 340).

In the above examples, the SIM card used is a standard SIM card, no additional hardware or software on the SIM card are needed for the ASM. All of the modifications can be on the network side and in the communications to the SIM card. Every SIM card is internationally identified by its integrated circuit card identifier (ICCID). ICCIDs are stored in the SIM cards and are also engraved or printed on the SIM card body. The ICCID is stored in the HLR. A user can then select a particular SIM card to be an ASM SIM card, by instructing the network to got through the ASM protocols when its identifies that particular ICCID. This allows any SIM card to be treated or not treated to the ASM protocols and changed between the two.

The first and second checkpoint times can be any time on the network as long as there are at least two checkpoints: one for clearing and another for resetting. The two checkpoint times can be separated by any interval: seconds, minutes, hours, days, etc. In one example it can be every minute, every 10 minutes, every half hour, every hour, and so on. One purpose of the checkpoints is to have indicators in the network as to what stage in the ASM protocols the network should be performing. Additionally, there are indicators to the testers as to the next time the SIM card can be reset.

The SIM card tester may or may not be aware that one or more of the ASM protocols are being executed, thus the protocols can be transparent to the tester. Alternately, the tester can be notified as each protocol is performed (e.g., clearing (step 310), resetting (step 320), and reactivating (step 330)). Additionally, the tester can be notified as the first and second checkpoint times are approaching and/or past to determine if the tester wishes to have the ASM SIM card run the particular protocol.

Crossing over a checkpoint time does not affect a BIP session 402, 414, 424 that is currently running. For example, if the cleaning BIP session 414 begins running before and is running after the second checkpoint time is passed, the SIM card is just cleaned, completing step 310. The SIM card is not reset (step 320) until the mobile station again communicates with the network for verification (i.e., authentication or activation).

Based on the above, in other examples, the checkpoint times can be set very close together. Even if the difference between the first and second checkpoint times is less than the time it takes to perform the clearing step, it will not effect performance. Thus, an illustrative example is that the checkpoint times are set 5 minutes apart, i.e., there is five minutes between the first and second checkpoints and then five minutes between the second checkpoint and the next first checkpoint. An ASM SIM card begins a clearing protocol (time=0) and that procedure takes 7 minutes. The SIM card has passed the second checkpoint (time=5 min), but, as above, it does not undergo the resetting protocol since the SIM card has not completed the clearing steps. The next first checkpoint passes (time=10 min) and the SIM card is not cleared a second time, since it was previously cleared. However, when the next second checkpoint comes around (time=15 min) the ASM SIM card undergoes the reset protocols. In this example, the user only waits 8 minutes from the time the clearing steps were completed until the next second checkpoint time is available.

Figure 5A:
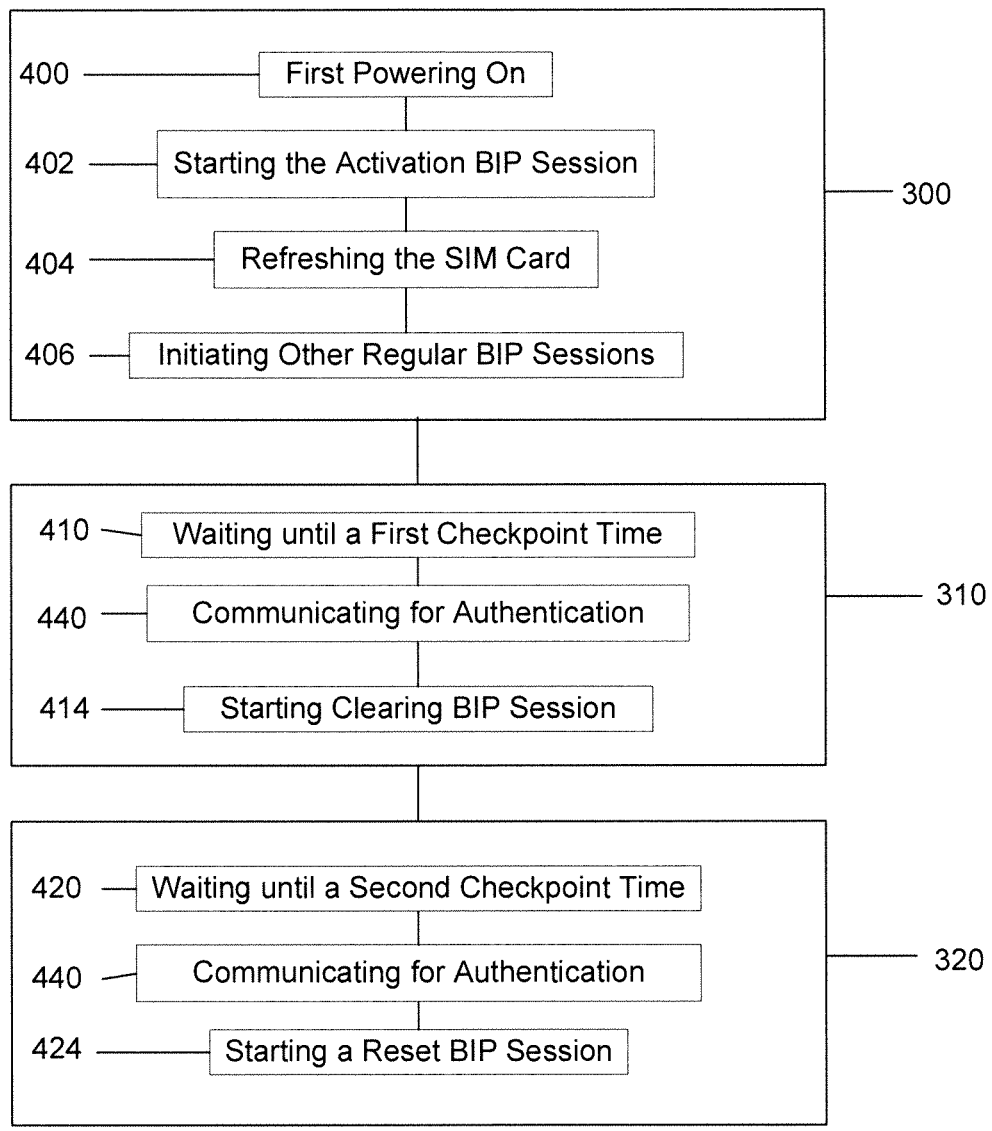
FIG. 5A is a flow chart outlining a further example of steps to reactive a UIC.
Figure 5B:
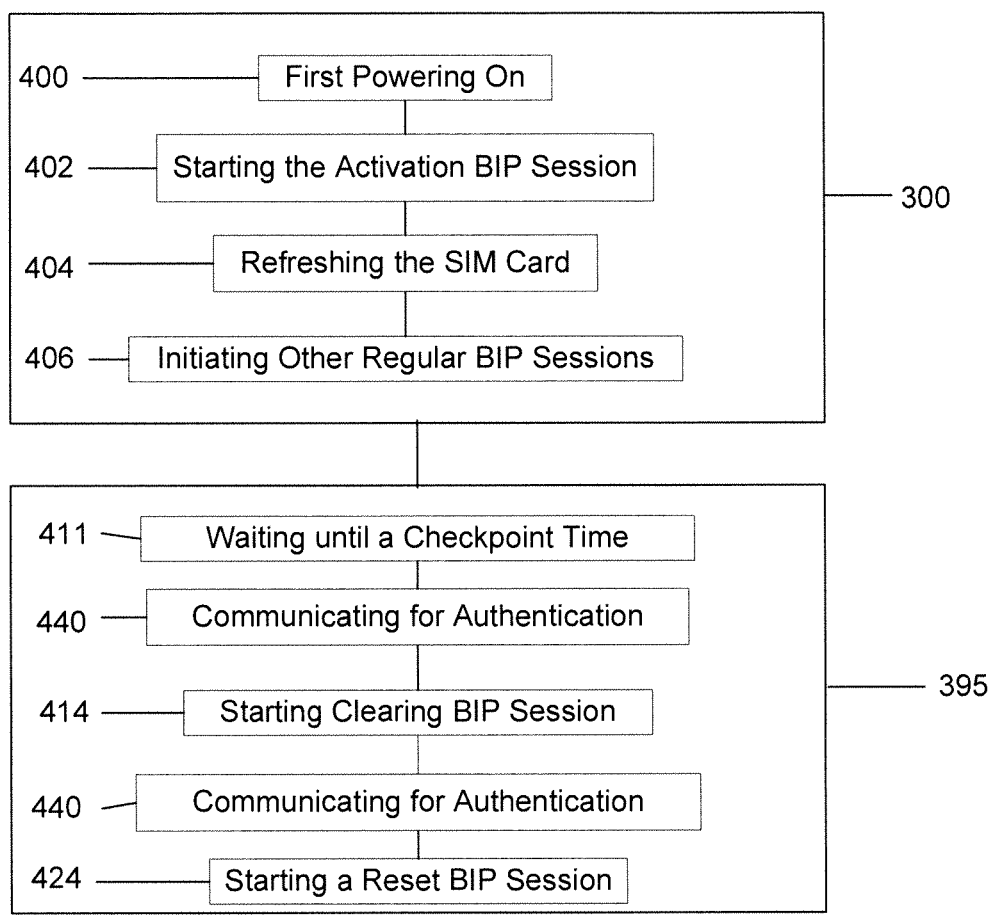
FIG. 5B is a flow chart outlining an example of steps to reactive a UIC.

Further, the examples above have steps to power on and off the mobile station/SIM card. In certain networks, powering on a mobile station automatically triggers the mobile station to communicate with the network to be authenticated and/or activated. It is this authentication communication that is routed to the particular parts of the network that can also activate a SIM card. Instead of powering the mobile station on and off, the "off" steps can be removed, and the "on" steps can be replaced with any activity or command that forces the mobile station to be verified in the network. One option is that the network sends a command to the mobile station 100 to authenticate again. FIGS. 5A and 5B illustrate this example.

FIG. 5A illustrates a similar example as FIG. 4, except the "powering off" steps, 408, 416, and 426 have been eliminated, and the new step of communicating for authentication (step 440) is added to replace the powering on steps, 412, 422. It is noted that the first powering on step 400 remains, since a SIM card should not be inserted into a mobile station that is powered on. However, the first powering on step 400 can also be replaced by a communicating step 440, as is known in the art.

Based on the above, a further example of a SIM card reactivation method can merge the clearing and resetting steps into one step. FIG. 5B illustrates this example, and, in comparison with FIG. 5A, the second checkpoint time (step 420) is removed. Here, the SIM card undergoes the initial activating step 300 and sub-steps (400, 402, 404, 406). Next is the merged protocols (step 395). Once a checkpoint time is reached (step 411), the network sends the command to the mobile station 100 to authenticate (step 440) and the network then sends the protocols to begin clearing the SIM card (step 414). Once the clearing step is completed, instead of waiting for a second checkpoint time, the network again communicates a request for authentication (step 440). After this request is responded to, the SIM card can be reset (step 424). To the user, only one checkpoint time needs to be reached and at the end of the ASM session, the SIM card is now ready for reactivation. In addition, the network can have a single checkpoint time and automatically makes the second authentication request to move from clearing protocols to resetting protocols.

Figure 6:
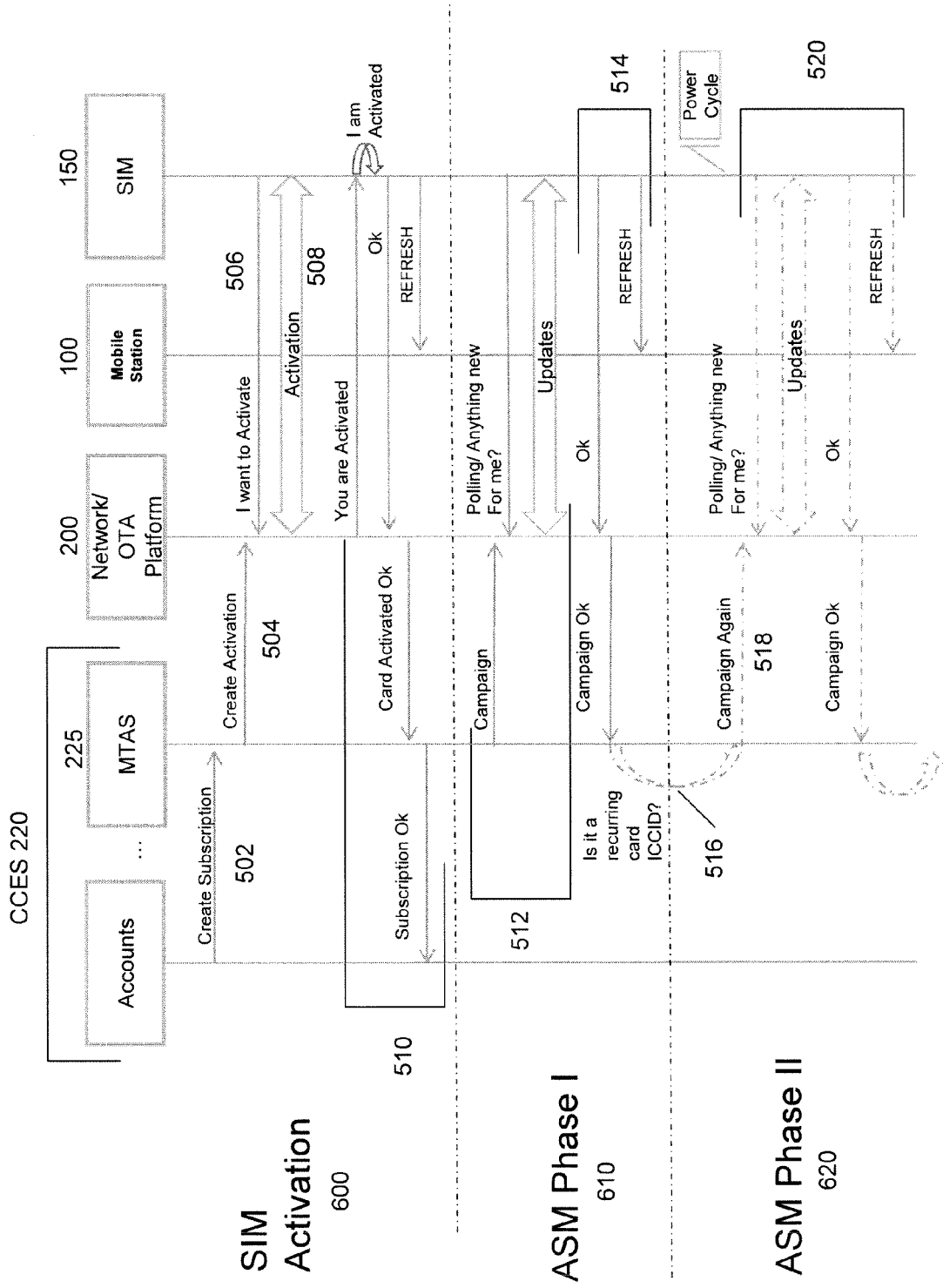
FIG. 6 is a diagram outlining a yet further example of reactivating a UIC.

FIG. 6 illustrates another example of the SIM card being cleared and re-activated. In this example, the SIM Activation (step 600) is similar to the SIM activation step 300, in the examples above, just provided in different detail. Here, the user subscription is created (step 502) and activated (step 504) in the CCES 220, particularly in the account and MTAS 225 servers. This subscription package is pushed to the network 200, and in one example to the OTA platform embodied in the MSC 210 and HLR 215. The mobile station 100 powers on and the SIM card 150 sends a request to the network to activate/authenticate (step 506). The network 200 approves the activation and communicates back and forth with the SIM card 150 and the mobile station 100 to complete the activation process (step 508). Upon completion, the network 200 informs the SIM card 150 that it is activated, the SIM card 150 acknowledges to the network 200 that it is activated, and acknowledgement is passed to the network/CCES (step 510).

ASM "Phase I" steps (step 610) are again similar to clearing the SIM card values step 310. Once the first checkpoint time is passed, when the mobile station 100 polls the network 200, a new "campaign" i.e. programming, is passed to the SIM card 150 over the network 200 and through the mobile station 100. The SIM card 150 is thus updated (step 512). Once the SIM card 150 indicates to the network 200 through an acknowledgment (OK) that the update has been successfully completed, the network 200 acknowledges this with the MTAS 225 (step 514). With the campaign OKed, the MTAS 225 determines if the SIM card is an ASM SIM, and should be subjected to ASM Phase II protocols (step 516). The MTAS 225 can identify an ASM SIM card by at least its ICCID. The ASM Phase II protocols (step 620) are again similar to resetting the SIM card (step 320) described above. Here, MTAS resends the "campaign" (step 518) to reset the SIM card and update the values accordingly (step 520). The steps in this transaction are: MTAS sends a command to the OTA platform to reset the SIM card. The SIM card opens up an IP connection to the OTA platform to retrieve the command, resets itself to the default state and sends a notification to the OTA platform that the reset is complete.

The difference between this example and the examples above, is that the MTAS 225, and not the network components, can be responsible for the identification of the ASM SIM and resetting the SIM. When the OTA platform/network 200 is responsible for the ASM protocols, determining if a SIM card is an ASM SIM card happens at the network 200, not the MTAS 225. Further, when handled by the network 200, the campaign is not resent, it is the network 200 that resets the values and waits for the mobile station/SIM card to request authentication/activation.

The method of involving the MTAS 225 in the ASM procedure adds another level of review and security to the process of activating a SIM card, and thus a mobile station, on the network 200, as the MTAS 225 is further removed from the network 200. A further example to reset the SIM card is that protocols can be installed on the SIM card itself. This makes the proper identification of the ASM SIM card even more desirable, since an ASM programmed SIM is specially programmed to reset itself. The "self-resetting SIM" option also alters the nature of the programming on a regular SIM chip for testing purposes.

Further, the method can viewed from the network 200 sending commands to the ASM SIM card 150, via the mobile station 100, or the mobile station 100 receiving the commands. Turning to FIG. 3B, the mobile station 100 can communicate with the network 200 to request activation of the SIM card (step 350). The network 200 can acknowledge the request and both the network 200 and mobile station 100 can start an activation session between the SIM card and the network (step 450). During activation, the SIM card 150, through the mobile station 100, receives from the network programming that includes the network parameters (step 360) so the mobile station can function on the network.

Once activated, the mobile station 100 can then receive a command from the network to clear the network parameters programmed on the SIM card (step 370). As above, now the mobile station waits until a first checkpoint time to verify with the network (step 470). While the mobile station is waiting, it can communicate normally with the network 200 and perform standard functions of a mobile station, e.g., make phone calls. After the first checkpoint time, the mobile station 150 can request verification of the SIM card (step 472), i.e. activation or authentication, so it can receive the first phase of ASM protocols. The mobile station can receive a command from the network to start the clearing step (step 474). This command is based on the unique identifier associated with the request that is from the SIM card, typically the ICCID.

The cleared SIM card can then receive a command from the network 200, through the mobile station 100, to reset itself to an unactivated state (step 380). Resetting can include waiting until the second checkpoint time (step 480), which occurs after the first checkpoint time. The mobile station 100 can send a second request to verify, i.e., activate or authenticate, the SIM card 150 to the network 200 (step 482). The command from the network to the mobile station starting the resetting step begins after the mobile station 100 attempts to verify itself on the network and is identified as having an ASM SIM card. The command from the network is not sent until after the mobile station has identified that it has an ASM SIM card. Further, the command can be executed by the SIM card only after the SIM card has been cleared (step 484). The reset command is based on the unique identifier associated with SIM card which is sent with the second request. The ASM protocols are now complete and the SIM card can now act as if it had never been activated before. The mobile station 100 can now communicate with the network to reactivate the reset SIM card with the network (step 390).

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g., files used for the various country determination and technology detection lists. The programming code is executable by a microprocessor of the mobile station 100, e.g. from storage in a flash memory. For downloading and installation, however, the software is stored within the general-purpose computer platform.

Figures 7, 8:
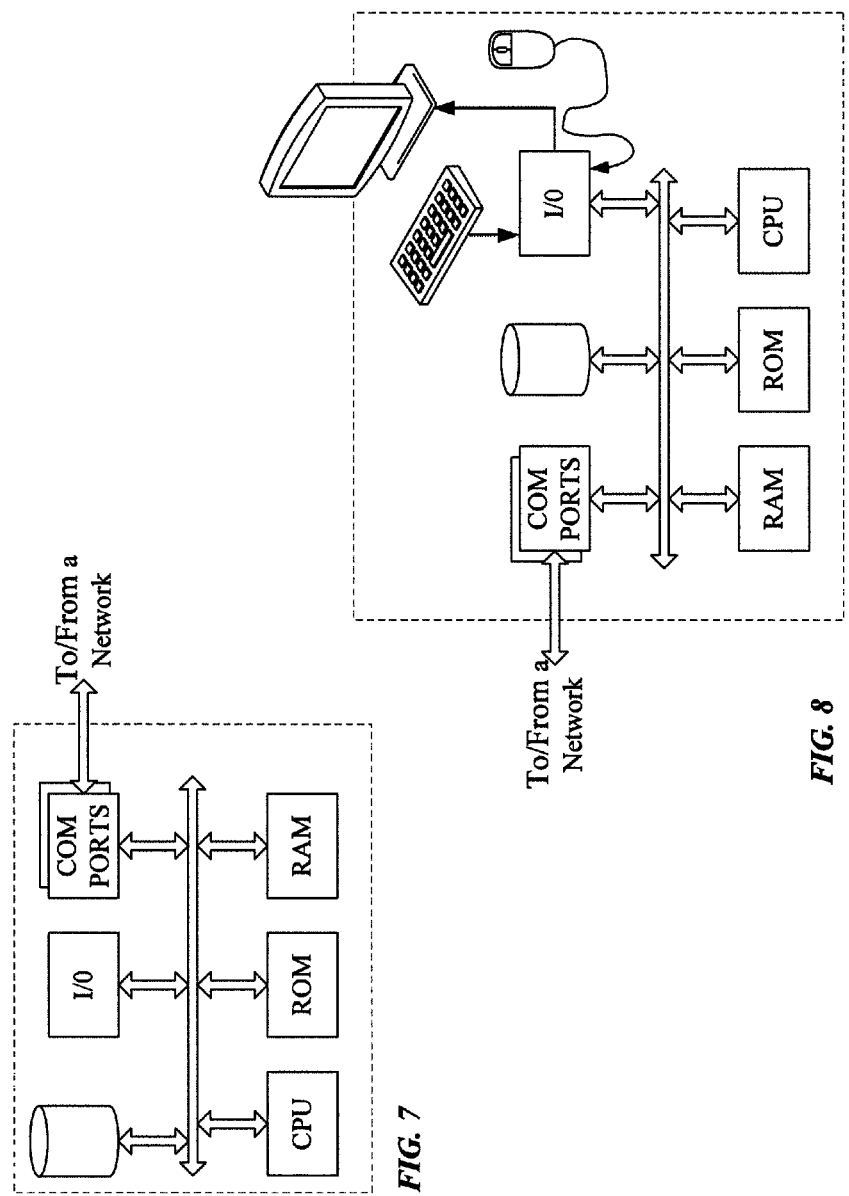
FIG. 7 is simplified functional block diagram of a computer that may be configured as a host or server.
FIG. 8 is a simplified functional block diagram of a personal computer or other work station or terminal device.

FIGS. 7 and 8 provide functional block diagram illustrations of general purpose computer hardware platforms. FIG. 7 illustrates a network or host computer platform, as may typically be used to implement a server such as the servers of the CCES 225. FIG. 8 depicts a computer with user interface elements, as may be used to implement a personal computer or other type of work station or terminal device, although the computer of FIG. 8 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of mobile network selection outlined above may be embodied in programming. Program aspects of the technology may be thought of as "products" or "articles of manufacture" typically in the form of executable code and/or associated list data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software programming from a computer or processor into the mobile station, for example, from a server or other computer of the mobile network operator into the mobile station(s) of the operator's customer(s). Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or a physical transmission medium. Non-volatile storage media include, for example, optical or magnetic disks, such as any of the storage devices in any computer(s) or the like, such as may be used to implement the information flow control, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions and/or associated list data to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method to reactivate a user identity card for a mobile station communicating with a network, comprising the steps of:
   activating the user identity card with the network, wherein the user identity card has a unique identifier, the activating including the steps of:
      sending a communication for the user identity card to the mobile station; and
      transmitting programming with network parameters to the user identity card;
   unactivating, subsequent to the activating step, the user identity card with the network, the unactivating including the steps of:
      sending a first command from the network to the mobile station completely clearing all network parameters programmed on the user identity card;
      determining, by a mobile telephone administration system, whether to send a second command from the network to the mobile station setting the cleared user identity card back to an unactivated state, based upon a determination that the user identity card is an active simulation mode user identity card and the user identity card should be unactivated based on the unique identifier of the user identity card; and
      responsive to the determining step, sending the second command from the network to the mobile station setting the cleared user identity card back to an unactivated state; and
   reactivating, subsequent to the unactivating step, the user identity card with the network, the reactivating including the step of:
      sending a third command from the network to the mobile station, to subsequently reactivate the user identity card with the network, from the unactivated state.

2. The method of claim 1, wherein the activating step further comprises the steps of:
   starting an activation session between the user identity card and the network; and
   sending a command from the network to the mobile station refreshing the network parameters on the user identity card.

3. The method of claim 1, wherein sending the first command comprises the steps of:
   waiting, at the network, until a first checkpoint time; and
   responding to a request from the mobile station to verify the user identity card,
   wherein the sending of the first command from the network to the mobile station is based on the unique identifier associated with the request.

4. The method of claim 3, further comprising the step of sending a fourth command, to the mobile station from the network, to send the request to verify the user identity card.

5. The method of claim 3, wherein sending the second command comprises the steps of:
   waiting, at the network, until a second checkpoint time, which occurs after the first checkpoint time; and
   receiving, from the mobile station, a second request to verify the user identity card, wherein the sending of the second command from the network to the mobile station occurs only after the user identity card has been cleared and is based on the unique identifier associated with the second request.

6. The method of claim 1, wherein sending the first command comprises the step of setting a mobile directory number to zero, a mobile subscriber integrated services digital network number to zero, and an international mobile subscriber identity to a not programmed state.

7. The method of claim 1, wherein sending the second command comprises the steps of:
   waiting, at the network, until a second checkpoint time; and
   receiving, from the mobile station, a second request to verify the user identity card, wherein the sending of the second command from the network to the mobile station is based on the unique identifier associated with the second request.

8. The method of claim 7, further comprising the step of sending a fifth command, to the mobile station from the network, to send the second request to verify the user identity card.

9. The method of claim 1, wherein sending the second command comprises the step of instructing the user identity card to reset an internal status.

10. The method of claim 1, the unactivating step further including the steps of:
for multiple cycles of waiting until a first checkpoint time and a second checkpoint time:
waiting, at the network, until a first checkpoint time of a respective cycle and thereafter sending the first command responsive to a first communication from the mobile station to verify the user identity card unless the first command was sent in a previous cycle and the second command was not sent in the previous cycle; and
waiting, at the network, until a second checkpoint time of the respective cycle and thereafter sending the second command responsive to a second communication to verify the user identity card only if all network parameters programmed on the user identity card are completely cleared responsive to the first command prior to the second checkpoint time of the respective cycle.

11. An article of manufacture, comprising:
at least one tangible, non-transitory machine readable storage medium; and
programming instructions embodied in said at least one medium for execution by a processor, wherein the programming instructions configure a network in communication with a mobile station to be capable of performing functions for reactivating a user identity card, the functions comprising:
activating the user identity card with the network, wherein the user identity card has a unique identifier, the activating including the steps of:
sending a communication for the user identity card to the mobile station from the network; and
transmitting programming with network parameters to the user identity card;
unactivating, subsequent to the activating step, the user identity card with the network, the unactivating including the steps of:
sending a first command from the network to the mobile station completely clearing all network parameters programmed on the user identity card; and
responsive to receiving a determination from a mobile telephone administration system that the user identity card is an active simulation mode user identity card and the user identity card should be unactivated based on the unique identifier of the user identity card, sending a second command from the network to the mobile station setting the cleared user identity card back to an unactivated state; and
reactivating, subsequent to the unactivating step, the user identity card with the network, the reactivating including the step of:
sending a third command from the network to the mobile station, to subsequently reactivate the user identity card with the network, from the unactivated state.

12. The article of claim 11, wherein the activating function further comprises the functions of:
starting an activation session between the user identity card and the network; and
sending a command from the network to the mobile station refreshing the network parameters on the user identity card.

13. The article of claim 11, wherein the function of sending the first command further comprises the functions of:
waiting, at the network, until a first checkpoint time; and
responding to a request from the mobile station to verify the user identity card,
wherein the sending of the first command from the network to the mobile station is based on the unique identifier.

14. The article of claim 11, wherein the function of sending the first command further comprises the function of setting a mobile directory number to zero, a mobile subscriber integrated services digital network number to zero, and an international mobile subscriber identity to a not programmed state.

15. The article of claim 13, wherein the functions further comprise the function of sending a fourth command, from the network to the mobile station, to request verification.

16. The article of claim 11, wherein the function of sending the second command further comprises the functions of:
waiting, at the network, until a second checkpoint time, which occurs after the first checkpoint time; and
receiving, from the mobile station, a second request to verify the user identity card,
wherein the sending of the second command from the network to the mobile station is based on the unique identifier.

17. The article of claim 11, wherein the function of sending the second command further comprises the function of instructing the user identity card to reset an internal status.

18. The article of claim 16, wherein the functions further comprise the function of sending a fifth command, from the network to the mobile station, to make the second request to verify the user identity card.

19. The article of claim 11, wherein the unactivating function further comprises the functions of:
for multiple cycles of waiting until a first checkpoint time and a second checkpoint time:
waiting, at the network, until a first checkpoint time of a respective cycle and thereafter sending the first command responsive to a first request from the mobile station to verify the user identity card unless the first command was sent in a previous cycle and the second command was not sent in the previous cycle; and
waiting, at the network, until a second checkpoint time of the respective cycle and thereafter sending the second command responsive to a second request to verify the user identity card only if all network parameters programmed on the user identity card are completely cleared responsive to the first command prior to the second checkpoint time of the respective cycle.

20. A method of reactivating a user identity card for a mobile station communicating with a network, comprising the steps of:
communicating with the network to request activation of the user identity card, wherein the user identity card has a unique identifier;
receiving, from the network in response to the activation request, programming that includes network parameters;

receiving a first command, from the network and subsequent to receiving the programming, to completely clear all network parameters programmed on the user identity card;

receiving a second command, from the network, to set the cleared user identity card back to an unactivated state; and communicating with the network to subsequently reactivate the user identity card with the network, from the unactivated state, wherein:

communicating with the network to request activation of the user identity card further comprises the step of starting an activation session between the user identity card and the network;

receiving the first command comprises the steps of:

waiting until a first checkpoint time to verify with the network; and requesting the network to verify the user identity card;

receiving the second command comprises the steps of:

waiting until a second checkpoint time, which occurs after the first checkpoint time; and sending a second request to verify the user identity card to the network receiving the first command from the network to the mobile station is based on the unique identifier associated with the request; and receiving the second command from the network to the mobile station occurs only after the user identity card has been cleared and is based on the unique identifier associated with the second request.

\* \* \* \* \*